March 4, 1930.  J. SLEPIAN  1,749,549
RECTIFIER
Filed Jan. 19, 1927
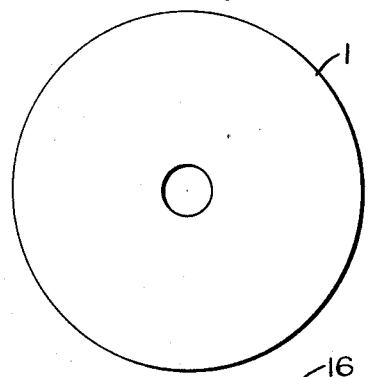
Fig. 1.
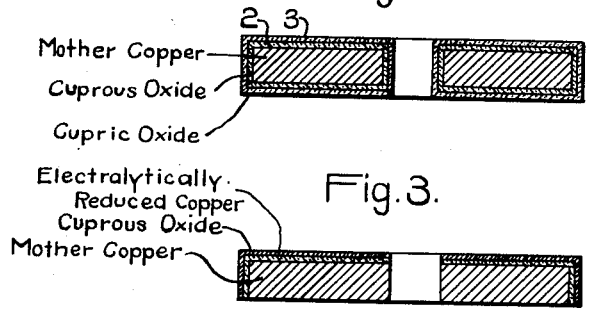
Fig. 2.
Fig. 3.
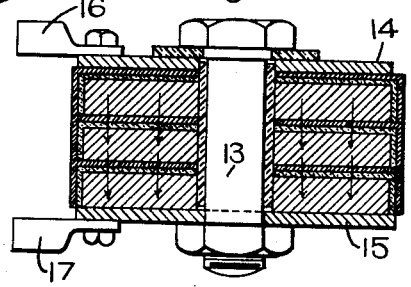
Fig. 4.
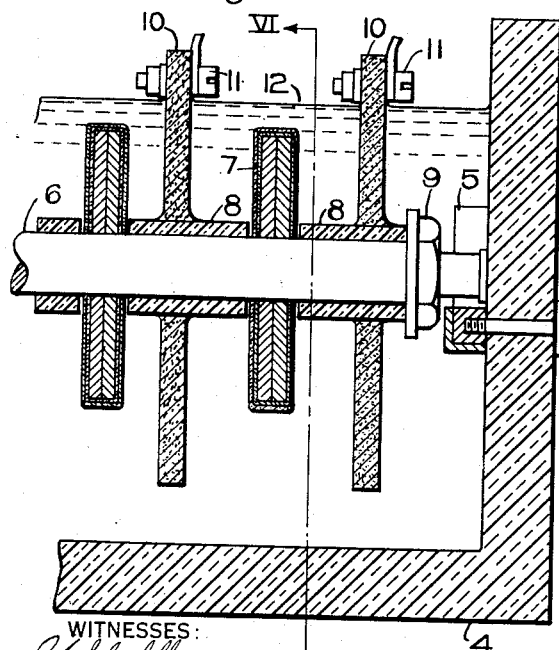
Fig. 5.
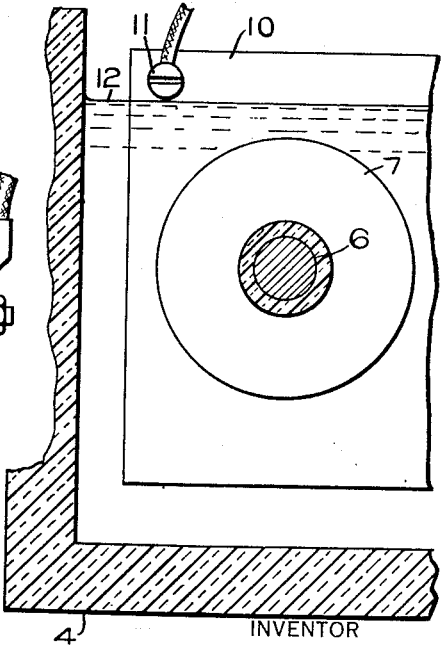
Fig 6
WITNESSES:
A. Schiefelbein
F. W. Lyle.
INVENTOR
Joseph Slepian
BY
Wesley G. Carr
ATTORNEY Patented Mar. 4, 1930

1,749,549

UNITED STATES PATENT OFFICE

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA

RECTIFIER

Application filed January 19, 1927. Serial No. 162,078.

My invention relates to rectifiers utilizing the uni-lateral electrical conductivity found to exist in the case of certain metals with respect to current flow across the junction between the metal and a chemical compound formed directly within the body thereof. Such rectifiers I designate as thin-layer rectifiers and, where the compound has been formed in the manner above described, the metal may be designated as mother metal. In the particular example which I describe in detail herein, a thin-layer rectifier is produced by oxidizing the surface of a copper base.

One object of my invention is to form good electrical contact between such oxidized layers and terminals by means of which the rectifier may be included in an electrical circuit.

Another object of my invention is to produce a conductor comprising a layer of a metallic compound forming with the metal on one side a junction possessing a uni-lateral electrical conductivity, and, on the other side, a junction with the same metal possessing a bi-lateral electrical conductivity.

Another object of my invention is to produce, on a metal oxide having a poor electrical conductivity, a surface having the ordinary conductivity characteristics of a metal.

My invention will best be understood by reference to the accompanying drawing wherein Fig. 1 is a plan view of a metal blank or disc from which my rectifier element is formed, Fig. 2 is a vertical sectional view showing, in an exaggerated form, the condition of the cuprous oxide and cupric oxide layers after heating the blank in air, which will be later described, Fig. 3 is a similar view showing the condition of the device after the reduction of the outer or cupric oxide layer, Fig. 4 is a similar view showing a plurality of the discs which have been further treated and assembled to provide a rectifying device, as will be subsequently described, Fig. 5 is a longitudinal sectional view of a part of an electrolytic bath utilized to practice the process of my invention, and Fig. 6 is a cross-sectional view of the same bath.

When blanks of certain metals are treated to form on one surface thereof a layer of a compound of the metal, the resulting conductor possesses a uni-lateral electrical conductivity to current flow normal to the plane of this layer. While different metals and different compounds thereof exhibit this effect in different degrees, copper and iron may be mentioned as examples of one and their oxides as examples of the other.

To illustrate the application of my invention to one specific case, a clean copper blank 1, which may be in the form of a circular washer, as shown in Fig. 1, is heated in air, or in an atmosphere containing oxygen, to produce a sufficiently thick oxidized coating thereon, the temperature of the heat treatment varying between about 500° centigrade and the melting point of copper, according to the different method of preparation although lower temperature may be utilized within the scope of my invention.

The heat treatment causes oxidization of the mother metal of the copper blank, thereby producing a layer 2 of red oxide of copper, or cuprous oxide, adjacent to the mother metal, and which may have a thin layer 3 of black high-resistance oxide, or cupric oxide outside the cuprous oxide layer. Fig. 2 shows the blank after such treatment. The oxidized copper blank thus prepared has rectifying qualities, transmitting current much more readily from the cuprous oxide layer 2 to the mother metal than in the reverse direction. Such unit may be said to possess a uni-lateral electrical conductivity.

While the rectifying unit thus produced has many very desirable qualities, the making of contact to the oxidized surface which is satisfactory from every standpoint has presented a problem of considerable difficulty.

It has been discovered that, if the surface of the oxide layer be reduced to the metallic state again the junction between the oxide layer and this reduced copper apparently possesses little or none of the uni-lateral electrical conductivity of the junction between the same copper-oxide layer and the mother copper but is, on the contrary, bi-laterally conducting. This surprising result has been made the basis of the solution of the above-mentioned problem which has been found of great practical value and constitutes the subject matter of my present invention.

In accordance with one form of my invention, the oxidized coating of the blank, above described, may be reduced electrolytically by piercing it at some suitable point, an electrical connection being thus obtained with the mother copper forming the interior thereof. Utilizing this connection, the blank is made the cathode in an electrolyte which discharges a cation capable of abstracting oxygen from the surface of the oxide and thereby reducing the latter. This reduction may be to the condition of metal copper. A firmly adherent surface layer results which makes a good electrical contact with other metallic surfaces and which has proved eminently suited to the requirements for terminal connections of copper-oxide rectifiers.

As specific examples of electrolytes suitable for this reduction, I have found dilute sulphuric acid, sodium hydroxide, potassium fluoride, and ammonium chlorate solution, to yield satisfactory results.

In consequence of the rectifying properties of the oxidized copper blanks made by my process, the supply source of the electrolytic cell need not be direct current, but an alternating electromotive force may be impressed between the electrode blank, above described, and a second electrode, preferably one, such as graphite, which is chemically inert to the electrolyte. The rectifying current which will flow through the cell produces the desired electrolytic reactions and a satisfactory contact surface on the blank.

To describe the process which I now consider preferable for the practical utilization of my invention, I have shown, in Figs. 5 and 6, an electrolytic bath contained in a tank 4 of suitable insulating material. On the end walls of the tank 4 I removably support, by metal terminal clips 5 connected to one side of the supply circuit, an arbor 6 of conducting material. After oxidizing a copper disc, as already described, I remove the copper oxide from one of its faces and ream out the center hole to lay bare the mother copper so that electrical contact may be obtained therewith. The blank thus treated I designate by reference character 7. When so machined, the discs fit tightly upon the arbor 6. I place a pair of discs 7 with their clean faces adjacent and slip the pair thus disposed upon the arbor 6. I then slide a collar 8 of insulation on the arbor 6, then another pair of discs 7, then another collar 8 and so on until the entire length of the arbor 6 is occupied. I clamp the whole series of discs in place on the arbor 6 by a nut 9 which screws upon the end of the arbor 6 for that purpose.

Midway of the length of the collars 8 are affixed graphite plates 10 which act as the second electrode for the cell and are connected, by suitable terminal studs 11, to the side of the supply circuit opposite to terminal clips 5. An electrolyte 12 fills the cell to the level indicated. The circuit connection to shaft 6 and to the graphite electrode 10 makes it possible to send current through the electrolyte 12 with a practically uniform density over the oxide surface of the disc 7.

To describe precisely the process which I consider preferable for carrying out the electrolytic reduction of the copper oxide discs, I employ as electrolyte a saturated solution of potassium fluoride. I first apply, between the terminals 11 and 5 an alternating electromotive force and adjust the current to the density of about 0.5 of an ampere per square centimeter of the immersed surface of the copper discs. I continue this treatment with an alternating electromotive force for approximately one minute and then switch the terminals 5 and 11 to a direct-current circuit and continue treatment at about 0.2 of an ampere per square centimeter for approximately 15 minutes. At the conclusion of this treatment, a uniformly conducting surface has been produced on the previously oxidized surface of the discs and, to this conducting surface, satisfactory contact may be made with ordinary terminal lugs by simple pressure. Fig. 3 shows the disc in its finished condition.

While I give the foregoing as a specific example of electrolytes which are satisfactory, my invention is by no means limited thereto but includes any subjection of the oxidized layer to a reducing reaction.

After treatment of the discs, as hereinbefore described, they are thoroughly washed to remove all the electrolyte adhering to their surfaces and then dried. A plurality of the discs thus treated may be superposed as illustrated in Fig. 4 to provide a rectifier which is able to withstand any desired counter-electromotive force, and the whole assembly may be clamped, by means of an insulating bolt 13, between two end plates 14 and 15 to which terminal conductors are attached, as indicated at 16 and 17, the direction of current flow being indicated by the arrows.

The unobvious character of the expedient here resorted to in order to attain a satisfactory contact at the oxidized surface will perhaps be more fully appreciated when it is considered that existing theory may be held to point directly away from the course actually pursued; since, to get full advantage of the uni-lateral conductivity of the junction between copper and cuprous oxide first produced, an ordinary bi-laterally conducting junction is required for the connection from the line terminal to the oxide. Yet, what I actually do is to produce, at the latter point, another junction between copper and copper oxide, the same materials which give unilateral conductivity at the junction first formed. The resulting unit thus apparently consists of a layer of copper oxide faced on each side with pure copper. As far as chemical analysis will show, therefore, the structure is a purely symmetrical one, yet its electrical conductivity is highly asymmetric since it conducts freely in one direction and hardly at all in the other. Whatever may be the difficulty of explaining this phenomenon, the unit thus produced has qualities which render it highly satisfactory in practical performance.

My invention, therefore, is not to be considered as confined to rectifiers having contacts produced by the precise electrolytic process which I have here described, since that is given merely by way of example of the general process of reduction, but I intend it, as claimed, to include rectifiers having contacts produced by those modifications of the reduction process which will, without further invention, occur to the minds of persons skilled in the arts after reading this disclosure.

While I have described my invention as a contact rectifier or asymmetrical current conductor, it is to be understood that two contact rectifiers may be connected in opposition to provide a condenser for alternating currents, and I intend that the expression "contact rectifier" in the appended claims shall embrace the use of the device in a condenser or any other uses to which it may be put.

In the foregoing description I have referred to the layer of red oxide by the term "cuprous oxide" and the thin outer layer of black oxide which may be present by the term "cupric oxide". While I have employed the terms "cuprous" and "cupric" in the specification and claims to refer to these oxide layers, I do not mean to specify that either layer is a pure homogeneous compound or that cupric oxide or even normal unstable oxides may not be admixed in the layer which I designate as cuprous oxide.

Although I have shown and described my process and apparatus in the above embodiment thereof, it is to be understood that it is not limited thereto, as many changes and modifications will readily suggest themselves to skilled workers of the art. I desire, therefore, that the appended claims shall be accorded the broadest interpretation consistent with their wording and with the state of the art.

I claim as my invention:

1. The method of preparing a unidirectional current-carrying device which comprises forming, between a metal and a compound thereof, a junction possessing a unilateral electrical conductivity and subjecting the surface of said compound to electrolytic reduction.

2. The method of preparing an electrical conductor possessing a uni-lateral conductivity which comprises forming, on copper, a compound thereof and subjecting the surface of said compound to electrolytic reduction.

3. The method of preparing a uni-directional current-carrying device which comprises oxidizing metal electrodes and subjecting the surface of said oxide to electrolytic reduction.

4. The method of preparing a uni-directional current-carrying device which comprises partially oxidizing a copper electrode and subjecting the surface of said oxide to reduction by electrolysis.

5. The method of preparing a metal for utilizing the rectifying properties of a junction between the metal and a chemical compound thereof which comprises forming a layer of the compound on the metal and reducing the surface of said compound to the metallic state by electrolytic reduction.

6. The method of imparting to a copper conductor a uni-directional conductivity which comprises forming thereon a surface layer comprising a copper compound, using said conductor as an electrode in an electrolyte yielding ions capable of reducing said surface to the metallic state, and passing current through said electrolyte to said electrode.

7. The method of preparing a uni-directional carrying device which comprises oxidizing a surface of a metal, using said metal as an electrode in an electrolyte yielding ions capable of reducing said oxide, and passing current through said electrolyte to said electrode.

8. The method of forming a bi-lateral conductive contact with a metal compound in a thin-layer rectifier which comprises reducing a surface of said compound to the metallic state by electrolytic reduction.

9. The method of preparing a uni-directional current-carrying device which comprises heating a copper blank in contact with oxygen to form a layer of oxide on the mother copper, utilizing said blank as a cathode in an electrolyte under such conditions as to produce a surface of reduced copper on a part of said oxides and making terminal contacts with said mother copper and with said reduced copper.

10. The method of preparing a uni-directional current-carrying device which comprises using a copper blank having an oxidized surface as one electrode in an electrolytic cell containing an electrolyte yielding ions capable of reducing said surface, and impressing an alternating electromotive force between that electrode and another electrode in said cell.

11. An electrical conductor comprising a layer of mother copper, a layer of a compound of oxygen with said mother copper, and, adjacent to said last layer a third layer produced by electrolytic reduction of said second layer.

12. A conducting body comprising a base of mother metal, a layer comprising a chemical compound of said mother metal, and a third layer produced by electrolytic reduction of said chemical compound.

13. A rectifier comprising one terminal layer of mother metal, an intermediate layer integral therewith comprising an oxide of said metal, and, integral with said intermediate layer, another terminal layer produced by electrolytic reduction of said oxide.

14. A conducting body comprising a layer of mother metal, a layer formed by treating the mother metal to produce such compound thereof that the junction between said two layers possesses a uni-lateral electrical conductivity, and a third layer produced by electrolytic reduction of said compound.

15. A uni-directional current-carrying device comprising a layer of copper, a layer of copper oxide in contact therewith and a layer of electrolytically reduced copper in contact with said copper oxide.

16. A uni-directional current-carrying device comprising a layer of mother copper, a layer of a compound of copper with oxygen formed therefrom, and a layer of copper formed by electrolytically reducing a portion of said compound.

17. An electrical conductor comprising a layer of mother copper, a layer of a compound of oxygen with said mother copper, and adjacent to said last layer a third layer produced by using said second layer as an electrode surface in an electrolytic cell.

18. A conducting body comprising a base of mother metal, a layer comprising a chemical compound of said mother metal, and a third layer produced by using said second layer as an electrode surface in an electrolytic cell.

19. A conducting body comprising a base of metal, a layer comprising a chemical compound of said metal, and a third layer produced by electrolytic reduction of said chemical compound.

In testimony whereof, I have hereunto subscribed my name this 14th day of January, 1927.

JOSEPH SLEPIAN.